United States Patent [19]

Nagai et al.

[11] Patent Number: 4,494,288
[45] Date of Patent: Jan. 22, 1985

[54] METHOD OF PRODUCTION OF CROSS-FIN TYPE HEAT EXCHANGER

[75] Inventors: Teruhisa Nagai; Takemi Naito, both of Yanai, Japan

[73] Assignee: Hitachi, Ltd., Tokyo, Japan

[21] Appl. No.: 289,108

[22] Filed: Jul. 31, 1981

[30] Foreign Application Priority Data

Aug. 8, 1980 [JP] Japan ................................. 55-108326

[51] Int. Cl.³ ............................................. B23P 15/26
[52] U.S. Cl. .......................... 29/157.3 A; 29/157.3 B; 29/157.3 C
[58] Field of Search ................... 29/157.3 A, 157.3 R, 29/157.3 B, 157.3 AH, 157.3 C

[56] References Cited

U.S. PATENT DOCUMENTS 1,339,434  5/1920  Coffelder .............................. 29/727
1,742,414  1/1930  Rogers ................................. 29/727
3,427,427  2/1969  Rudd .................................. 228/183

Primary Examiner—Howard N. Goldberg
Assistant Examiner—V. K. Rising
Attorney, Agent, or Firm—Antonelli, Terry & Wands

[57] ABSTRACT

A method of mechanically producing in a continuous process a cross-fin type heat exchanger having a large fin pitch for use as a natural convection type radiator or a solar heat collector including heat collecting surfaces formed by bending the fins. A plurality of openings, respectively, accommodating a pipe therein, are formed in a continuous plate and the plate is cut into a plurality of strips of a width equal to a predetermined fin width. The strips are twisted through 90° while being fed and set on a jig in such a manner that the openings formed in the strips are aligned in a straight line and the strips are spaced apart from one another by a predetermined fin pitch. The pipes are inserted in the openings in the strips in such a manner that each pipe extends through the openings in the adjacent strips set on the jig. The pipes are secured to the strips so that the strips serve as fins, and the strips are cut at any time as desired after being set on the jig.

6 Claims, 12 Drawing Figures

METHOD OF PRODUCTION OF CROSS-FIN TYPE HEAT EXCHANGER

BACKGROUND OF THE INVENTION

This invention relates to a method of producing a cross-fin type heat exchanger, such as a natural convection type radiator or a solar heat collector having heat collecting surfaces formed by bending the fins, and, more particularly, to a method for mechanically producing a heat exchanger of the aforementioned type having a large fin pitch by a continuous process.

A cross-fin type heat exchanger may, for example, be used in a forced circulation type solar heating system wherein a cabinet 1 has a light transmitting member 2, formed of glass, fitted to a front side thereof and a heat insulating layer 3 fitted to a rear side thereof. A heat collecting section 4, in the form of a cross-fin heat exchanger, include an inlet header 5, an outlet header 6, pipes 7, through which a heated medium flows, and fins 8 formed of aluminum, copper, etc., secured to the pipes 7. The fins 8 have a thickness in the range between 0.15 and 0.6 mm and are formed with burred openings through which the pipes 7 extend, after the fins 8 are placed one over another with a spacing interval of about 30 mm. Production of the heat exchanger 4 is completed by expanding the pipes 7 which are spaced apart from one another by a spacing interval of 50–100 mm. The fins 8a on the rear side are bent to provide heat collecting surfaces. FIG. 3 shows the fins 8a being forced by the heat insulating layer 3 into contact with the pipes 7.

The solar heat collector is installed in such a manner that the heat collecting surfaces 8a are disposed at right angles to the sun's rays for a predetermined period of time (usually in the daytime in summer) to collect heat by using the surfaces 8a as heat collecting surfaces during the predetermined period of time. The surfaces 8a and fin surfaces 8b on the front side are used as heat collecting surfaces during other periods of time, to collect heat.

Generally, in producing cross-fin type heat exchangers, to insure that the fins are spaced apart from one another by a predetermined spacing interval burred openings are formed in the fins, with the burrs of the openings having a height equal to the desired spacing intervals of the fins when the fins are placed one above another in a spaced superposed relationship. This process does not lend itself to stacking fins having burrings of a large height. In this case, the following process is usually adopted. As shown in FIG. 4, fins 12, formed with burred openings 11, are stacked one above another in spaced superposed relationship by dropping the fins 12 to permit the burred openings 11 to be penetrated by guides 14 on a block 13, to provide a stack of fins 12. The fins 12 are then removed from the guides 14 and inserted in grooves 16 formed in an interval setting jig 15, as shown in FIG. 5. Thereafter, the pipes 17 are inserted in the aligned burred openings 11 and expanded into intimate contact with the fins 12, to provide a unitary structure.

This fabricating process raises many problems. Insertion of the fins 12 in the grooves 16 is manually performed, so that the working may be carried out intermittently and become erratic as the fins 12 are stacked and the fins 12 are inserted in the jig. The fins 12 having a relatively small thickness and had no rigidity, so that difficulties are experienced in inserting the fins in the interval setting jig 15 and the operation is time-consuming and requires a lot of labor. Additionally, the fins 12 have a large height and are very unstable because they are usually placed in an upright position, thereby posing the problem of safety in operation.

SUMMARY OF THE INVENTION

This invention has been developed for the purpose of obviating the disadvantages of the prior art. Accordingly, object of the present invention resides in providing a method mechanically producing a cross-fin type heat exchanger in a production process of continuously fabricating the cross-fin type heat exchanger with a large spacing interval.

The outstanding characteristic of the invention is that a stock is formed by stamping with holes for inserting pipes and cut longitudinally in a direction in which the stock is fed to provide a plurality of strips each having a width equal to the desired width of fins, followed by twisting of the strips through 90° while being fed and fitted in an interval setting jig, so that the fins can be automatically arranged in a horizontal direction with the predetermined spacing interval therebetween.

DETAILED DESCRIPTION OF THE PREFERRED EMBODIMENTS

Figure 6:
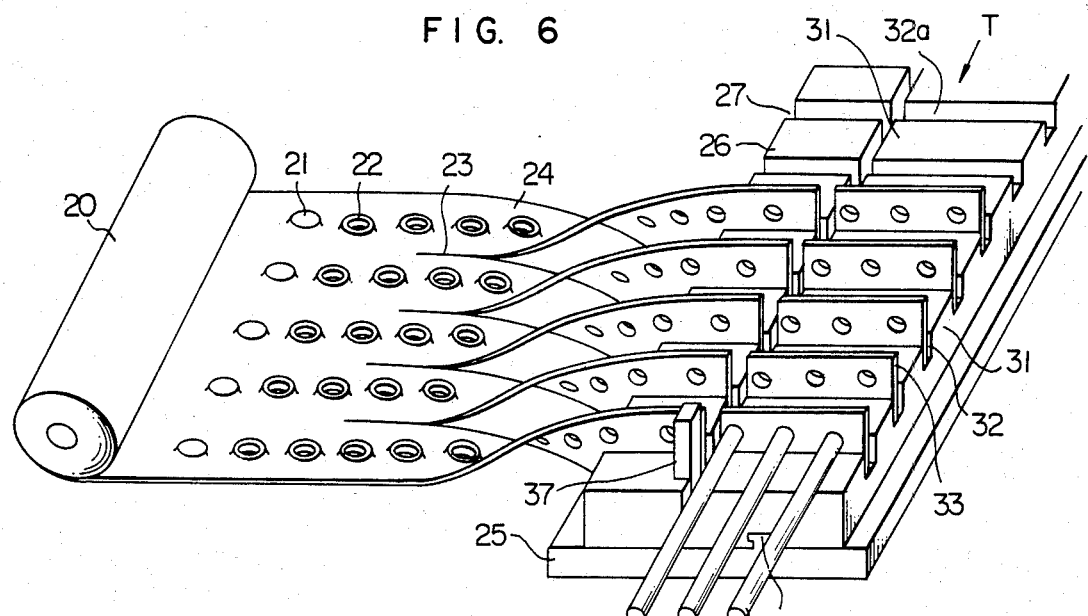
FIG. 6 is a schematic view of the production process for a cross-fin type heat exchanger in accordance with the present invention.
Figure 7:
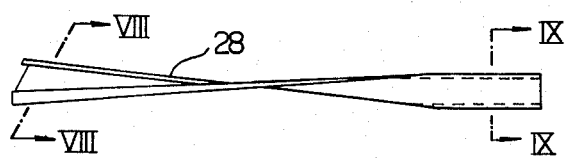
FIG. 7 is a perspective view of a guide used in the invention.
Figure 8:
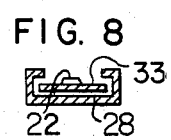
FIG. 8 is a cross-sectional view taken along the line VIII—VIII in FIG. 7.
Figure 9:
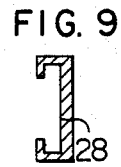
FIG. 9 is a cross-sectional view taken along the line IX—IX in FIG. 7.

Referring now to the drawings wherein like reference numerals are used throughout the various views to designate like parts and, more particularly, to FIG. 6, according to this figure, a stock material in the form of a strip 20 of aluminum or copper of a small thickness, arranged in coil form, is provided with a plurality of drawings 21, with the drawings 21 being subsequently processed into burred openings 22. The strip 20, with the burred openings 22 arranged in rows and columns, is scored as indicated at 23 to form the strip 20 into a plurality of individual strips 24. The three steps, namely, drawing, burring and scoring, are performed simultaneously or separately as the strip 20 is successively fed. Also, the three steps are carried out in a horizontal plane by maintaining the strip 20 in a horizontal condition. Then the plurality of individual strips 24 are fed while being twisted from the horizontal condition into a vertical condition, and inserted in grooves 27 formed in an interval setting jig 26 secured to a jig board 25, to have their spacing interval increased or decreased to obtain a predetermined fin pitch. Although not shown in FIG. 6, guides 28 of the channel-shape as shown in FIGS. 7-9 may be mounted in the section in which the strips 24 are fed while being twisted, when necessary. The guides 28 are also twisted, as can be seen in FIG. 7. In FIG. 6, the burring is performed on the left side and the interval setting jig 26 is located on the right side. The guides 28 have the function of preventing deformation or sagging of the strips 24 due to the twisting or vibration. The strip twisting section has a sufficiently large distance to allow twisting of the strips to be performed slowly and smoothly, to avoid deformation of the strips 24 by twisting.

Then the strips 24 are further inserted into predetermined positions in grooves 32 formed in another interval setting jig 31 located downstream of the intverval setting jig 26 in an adjacent relationship so that the grooves 32 are parallel to the grooves 27 of the jig 26. Thereafter, the strips 24 are cut between the two interval setting jigs 26 and 31, to provide fins 33 of a predetermined length.

The interval setting jig 31 is moved in the direction of an arrow T on rails 35 on the jig board 25 while supporting the fins 33 thereon, and a new jig with grooves 32a is substituted for the jig 31 so that the grooves 32a are aligned with the grooves 27 of the jig 26. The aforesaid step is repeated to provide another set of fins 33 of a predetermined number on the interval setting jig 31.

Pipes 36 are each inserted in one of the rows of burred openings 22 of the fins 33 and expanded into intimate contact with the fins 33.

Figure 1:
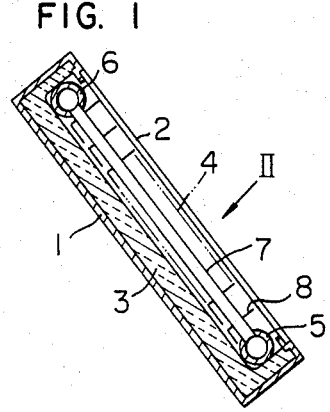
FIG. 1 is a vertical sectional view of a solar heat collector.
Figure 2:
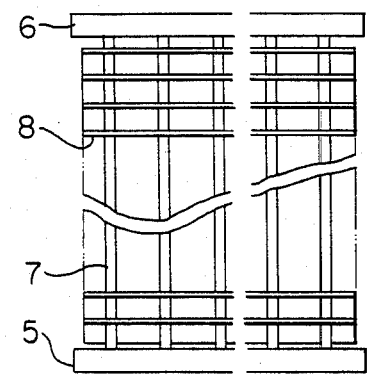
FIG. 2 is a view of the heat collecting section of the solar heat collector as viewed in the direction of an arrow II in FIG. 1.
Figure 4:
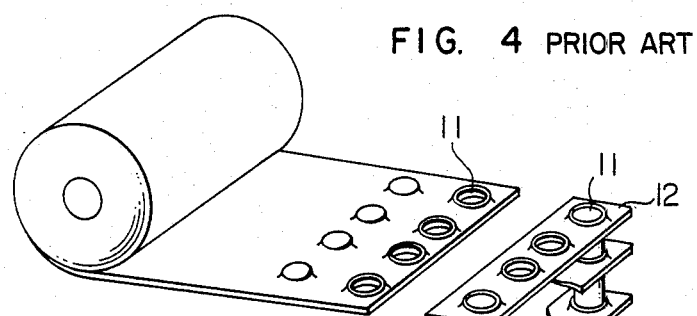
FIG. 4 is a view of a prior art process for producing a cross-type heat exchanger illustrating the manner in which the fins are formed with burred openings by stamping to provide stocked fins.
Figure 3:
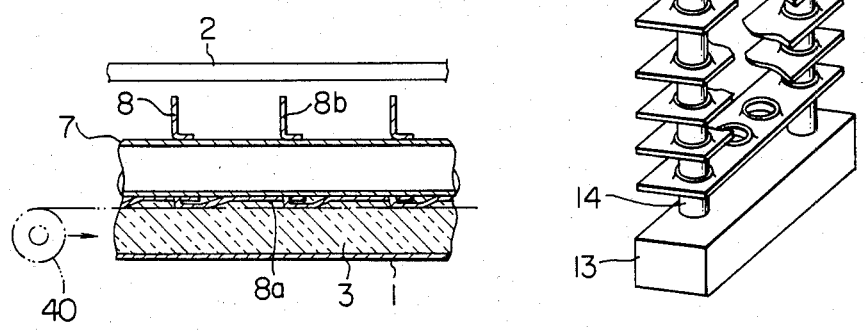
FIG. 3 is a vertical sectional view of the heat collecting section of the solar heat collector shown in FIG. 1.
Figure 5:
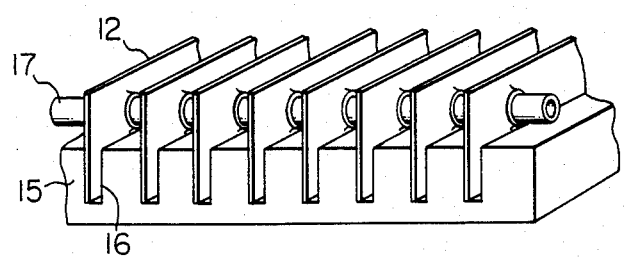
FIG. 5 is a view of a prior art process for producing cross-fin type heat exchangers illustrating pipes inserted in the burred openings of the fins.

When the fins are bent to provide heat collecting surfaces as is the case with a solar heat collector, a roll 40 is moved in the direction of an arrow as shown in FIG. 3, to bend the fins 33. The angle at which the fins are bent with respect to the pipes is selected based on the distance from the pipes 7.

Figure 10:
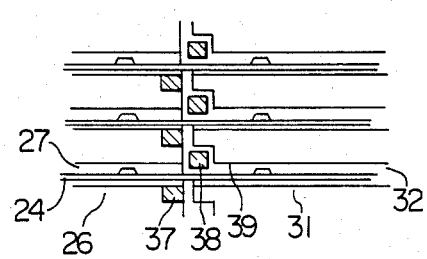
FIG. 10 is a schematic plan view of a device for cutting the strips to provide fins used in the invention.

Severing of the fins 33 from the strips 24 on the jig board 25 will be described by referring to FIGS. 6 and 10. Cutters 37 are provided on the interval setting jig 26. In the interest of brevity, FIG. 6 shows only one cutter 37 for the rightmost groove. A cutter 38 cooperates with the cutter 37, with the cutter 38 being disposed above the surface of the fin 33 when no cutting operation is performed. In operation, the cutter 38 is moved downwardly into a recess 39 formed in the interval setting jig 31 and is moved in the direction of the arrow T together with the interval setting jig 31, to sever the fin 33 from the strip 24. After severing, the cutter 38 is moved upwardly and is supported by the interval setting jig 31.

In the embodiment shown and described hereinabove, the predetermined number of fins 33 are arranged on the interval setting jig 31 and the pipes 36 are inserted in the burred openings 22 and expanded in the same position. It is to be understood that the invention is not limited to this specific arrangement and that insertion and expansion of the pipes 36 may be performed after the interval setting jig 31 supporting the fins 33 thereon is moved to a position different from the position in which the fins 33 are placed on the jig 31, so as to allow the operation time to be divided into a suitable number of steps. When the jig 31 is moved to another position, the fins 33 should be held positively in place in the grooves 32 to avoid their dislodging therefrom.

In the embodiment shown and described hereinabove, the strips 24 are cut to sever the fins 33 therefrom after the interval setting jig 31 is moved a predetermined number of times, and thereafter the pipes 36 are inserted in the burred openings 22 in the fins 33. The strips 24 may be cut to sever the fins 33 after the pipes 36 are inserted in the burred openings 22 and expanded. When the fins are provided in numbers necessary for functioning as a cross-fin type heat exchanger in one processing step, there is no need to move the interval setting jig 31 and the strips 24 may be cut after the pipes 36 inserted in the burred openings 22 are expanded. The interval setting jig 31 may be advantageously constructed to set the fins for the predetermined number of times as aforesaid and to be moved in the right angle direction.

In the embodiment shown and described hereinabove, cutters 37, 38 are used for cutting the strips 24 to sever the fins 33 therefrom; however, it is understood that the invention is not limited to this specific form of cutting means and that other means, such as a LASER beam.

Roll means for pulling the strips 24 may be provided for the guides 28 and interval setting jig 26, to avoid deformation of the strips 24.

In FIG. 6, one strip 24 is formed with one row of burred openings 22 alone. It is to be understood that the invention is not limited to the strips of this specific construction and that a plurality of rows of burred openings may be formed in one strip.

Figure 12:
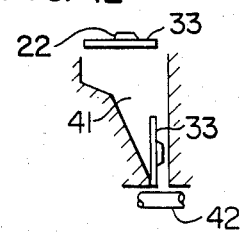
FIG. 12 is a schematic vertical cross-sectional view of the fin feed device used in another embodiment of the invention.
Figure 11:
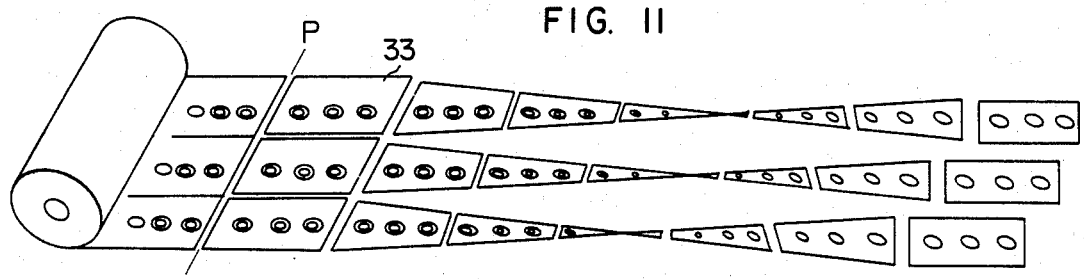
FIG. 11 is a plan view showing the flow of fins in the production process comprising another embodiment of the present invention.

As shown in FIG. 11, the strips 24 may be cut at a point P to sever fins 32 of a predetermined length therefrom, prior to being twisted, and the fins 32 may be fed by means of the guides 28 shown in FIGS. 7-9. In this case, vibration may be imparted to the guides 28 to cause same to perform a feeding operation. Also, the guides 28 may be provided with feed rolls. When the fins are fed after being severed from the strips 24, the severed fins may be twisted through 90° while being moved downwardly. For example, as shown in FIG. 12, the severed fin 33 may be dropped into a groove 41 and fed by a roller 42 located below the groove 41. However, as shown in FIG. 6, the fins are advantageously severed from the strips 24 as the latter are arranged in parallel to one another because errors that might be made in feeding the fins can be avoided.

From the foregoing description, it will be appreciated that according to the invention, a stock material is formed with openings 22 for inserting pipes 36 and cut longitudinally into a plurality of strips 24 each having a predetermined width of the fins, and the strips 24 are twisted through 90° or fed in the feeding direction while being twisted, before being set in position with a predetermined spacing interval. This permits the steps starting with forming of the openings 22 and ending with setting of the strips 24 with a predetermined spacing interval to be performed mechanically. Working can be done in a stable condition throughout the process, because the pipes 36 can be inserted in the openings 22 in a horizontal position and the cross-fin type heat exchanger can be placed horizontally upon completion.

What is claimed is:

1. A method of producing a cross-fin type heat exchanger, the method comprising the steps of:
    forming a plurality of openings in a plate for accommodating a pipe therein,
    cutting said plate in a longitudinal direction into a plurality of strips of a width equal to a predetermined fin width
    twisting said plurality of strips through 90°,
    setting the the twisted strips on a jig in such a manner that the plurality of openings are aligned in a straight line and the strips are spaced apart from one another by a predetermined fin pitch,
    inserting a plurality of pipes in said openings in said strips in such a manner that each pipe extends through the openings in the adjacent strips set on the jig,
    securing said pipes to said strips so that the strips serve as fins, and
    cutting said strips in a direction perpendicular to the longitudinal direction at any desired time following the setting step.

2. A method as claimed in claim 1, further comprising the step of arranging said strips in such a manner that in the inserting step, the openings are arranged in a straight line in a horizontal direction.

3. A method as claimed in claim 1, wherein said twisting step is performed while the strips are being continuously fed, and wherein said cutting step is performed following the setting step.

4. A method as claimed in claim 1, wherein a plurality of jigs are provided, and wherein, following each cutting step a new jig is introduced so as to enable a continuous performing of the forming, twising, inserting, securing, and cutting steps for a predetermined number of times corresponding to a number of said plurality of jigs.

5. A method as claimed in claim 4, wherein a plurality of jigs are provided so as to enable a carrying out of a predetermined number of setting steps, and further comprising the step of sequentially moving said plurality of jigs in a direction substantially perpendicular to the feed direction of the strips so as to enable the performing of the predetermined number of setting steps.

6. A method as claimed in claim 4, further comprising the step of sequentially moving said plurality of jigs in a direction substantially perpendicular to the feed direction of the strips so as to enable the performing of the predetermined number of steps.

* * * * *